United States Patent Office 3,245,938
Patented Apr. 12, 1966

3,245,938
POLYVINYL ACETATE EMULSION SIZE FOR TREATING GLASS
William J. Dennis, 24 Rosewood Ave., Guelph, Ontario, Canada
No Drawing. Filed Mar. 7, 1963, Ser. No. 263,435
Claims priority, application Canada, Nov. 21, 1958, 762,974
8 Claims. (Cl. 260—29.6)

This application is a continuation-in-part of my co-pending application Serial No. 853,701, filed November 18, 1959, now abandoned.

This invention relates to improvements in the manufacture of size for the treatment of glass filaments.

When a number of individual glass filaments are drawn and bunched together to form a strand or "sliver," it is usual to apply a size to the individual glass surfaces just prior to the bunching operation. For example, in a common design of drawing head, 204 filaments are drawn simultaneously and are brought together in the valley of a V-shaped graphite wheel to form a single sliver. Just before entering the recess in the periphery of the wheel, the filaments, still to some degree spread apart, make light contact with an end of a moving belt as it passes around a roller. Another portion of this belt dips into a vessel containing liquid size so that an excess of size is maintained at all times on the belt for transfer to the filaments.

Glass coating sizes are required to have certain basic characteristics. Firstly, they should have the property of adhesiveness, so as to serve to hold the filaments together once they have been bunched, to act subsequently as a unitary sliver. Secondly, any size must have the property of bonding itself firmly to the glass surfaces of the filaments. If the glass slivers are to be further combined with one another into rovings for making woven glass cloth which is then to be laminated with a synthetic material such as a polyester resin to form a reinforced laminated sheet material, then the size must exhibit the further property of establishing good coupling with the resin. Such glass reinforced laminates are extensively used in boat building and for other structural purposes where a tough and mouldable synthetic sheet material is required.

Additionally, it is desirable for a size to incorporate some lubricating properties to facilitate flexure to the slivers and rovings during subsequent manipulation and to avoid the abrasive cutting of the glass filaments by rubbing against one another that will occur in the absence of a lubricant, giving rise to the formation of loose ends of glass projecting from the rovings, or undesirable fuzziness.

Thus, a typical size will normally consist of essentially four ingredients:

(a) An adhesive agent;
(b) A coupling agent capable of establishing a good bond both with the glass and with a resin;
(c) A lubricant;
(d) A carrier, which will usually be water.

One of the most satisfactory adhesive agents known for use in such a size is a polyvinyl acetate emulsion. The present invention is concerned with a manner of improving the utility in a size of a polyvinyl acetate emulsion.

The present invention flows from the discovery that, if the polyvinyl acetate is subjected to treatment by a chlorine-containing strong acid prior to mixing with other conventional ingredients, glass treated with the resulting size shows markedly improved properties in respect of the dissipation of static electricity.

It should be explained that the generation of static electricity is a continuous problem to the worker in this art. In forming a number, say 30 or 60, slivers into a roving, these slivers are drawn simultaneously off packages mounted on a creel and are fed each through a number of eyes into a common passageway where they come together and any twist required is imparted. For efficient use of the equipment, it is essential to carry out such operations at high speed and the passage of the glass fibers in rubbing contact with fixed elements of the apparatus inevitably gives rise to the generation of static electricity. The established method of minimising this effect is to maintain the humidity high, but, although this is essential, it is not in itself sufficient to avoid undesirable effects, because the extent to which the electricity can be dissipated is also a function of the nature of the outer surface of the glass and thus of the nature of any coating on the glass.

The effect of poor dissipation of the static electricity generated is mutual repulsion of the various slivers, tending to prevent them lying closely together and often causing substantial outward bowing of the roving. The effect is particularly pronounced if the machine should be stopped for any reason, and it is not unknown, under such conditions, for the various slivers to separate from one another by a distance as great as two feet, or even greater distances if the manner of treading of the slivers through the apparatus will permit. It is impossible to restart a machine under these conditions without first dissipating the static electricity, and this requires attention on the part of the operator.

The discovery that a size including as an ingredient polyvinyl acetate which has been subjected to treatment by a chlorine-containing strong acid has markedly improved properties in facilitating the dissipation of static electricity is therefore of great practical importance.

The strong acid employed is preferably hydrochloric acid although other chlorine-containing strong acids such as trichloroacetic acid are also suitable. The treatment of the polyvinyl acetate is conveniently effected by adding an aqueous solution of the acid to an aqueous emulsion of polyvinyl acetate and allowing the mixture to stand at room temperature. It has been found that satisfactory results are not obtained unless the acid is present in the mixture in fairly high concentration; in general sufficient acid must be present to create a pH less than 2. The time for which the acid treatment must be continued to achieve the desired anti-static properties depends on the pH employed. Suitable pH values and times are, of course, readily determined by experimentation.

As a practical matter it is important that any treatment utilised for improving the properties of a glass size should be capable of completion within 24 hours. Production techniques are normally keyed to a 24 hour cycle and if a treatment time longer than 24 hours is necessary this renders the treatment unattractive from a commercial viewpoint. Although useful results can be obtained by carrying out the present process even at about pH 2 the length of time for which the treatment must then be continued is well above 24 hours and this is inconvenient as mentioned above. It has, however, been found that the treatment time required can be kept within a twenty-four hour period by operating at a pH of less than about 0.5. With a pH of about —0.1 a treatment time of about half an hour is sufficient. With higher pH values the required treatment time increases until above about 0.5 it becomes longer than twenty-four hours. It will be appreciated that the pH limit of 0.5 is of practical rather than a theoretical nature but it does represent the best numerical definition of a boundary between an eminently practical treatment which can be readily fitted into a production cycle keyed to a twenty-four hour period and treatments which require more than twenty-four hours to complete and are thus, inconvenient for practical use.

Since the modifying action on the polyvinyl acetate does not take place or takes place only very slowly at a pH above 2, it is possible to arrest this action, after a predetermined time, by increasing the pH to above pH 2. This may be accomplished by diluting the mixture with water or by adding an alkaline reagent. It is possible to utilize for this purpose the alkalinity of another ingredient of the size.

It may be mentioned that the formulation of glass sizes has hitherto frequently involved an adjustment of pH of the final size to a specified value and that this has sometimes involved contacting a polyvinyl acetate emulsion with a strong acid. However, the present invention requires the contacting of polyvinyl acetate with a strong acid at a sufficiently high concentration and for a sufficient length of time to produce whatever form of chemical or physical degradation it is that results in the observed increase in anti-static properties; a brief contact with the strong acid at low concentration will not answer the purpose and a minimum exposure time of about ten minutes is in general necessary. When operating with a polyvinyl acetate emulsion sold under the trade name Delplex No. 2002 and with a hydrochloric acid solution consisting of a mixture of equal parts of water and hydrochloric acid of 20° Bé. it has been found that the desired results are obtainable by the use of an amount of hydrochloric acid solution between 5 and 20% by weight of the polyvinyl acetate emulsion. Using 20% of this hydrochloric acid solution it was found that a minimum exposure time of 30 minutes was required to produce best results; using less than 5% of the acid solution the improvement in anti-static properties was inadequate even after a seven day period of contact. The numerical values given are, of course, practical limits for the specified case and are not to be construed as critical; using a different emulsion or a different acid different limits would prevail.

It has not been possible to ascertain why the treatment of polyvinyl acetate with a chlorine-containing strong acid should so modify its properties that sizes containing the treated resin have markedly improved anti-static properties. It seems likely that some kind of chemical degradation takes place. Possibly this consists of hydrolysis of some of the acetate groups followed by a cross-linking reaction. Evidently something more than mere hydrolysis is involved because the admixture of polyvinyl alcohol to a size containing polyvinyl acetate which has not been subjected to treatment with a strong acid does not enhance the anti-static properties.

It is possible to utilise polyvinyl acetate treated according to the invention as the adhesive agent in a glass size having any of the ingredients conventional in such sizes. However, it has been found especially valuable in connection with sizes containing as a coupling agent the partially polymerised hydrolysis product of a hydrolysable organo-silane particularly an unsaturated organo-silane, for example vinyl triethoxy silane, vinyl tri-methoxymethoxy silane or allyl-trichloro silane. The use of such silane derivatives in sizes is well-known.

The following examples, given by way of illustration and without limitation, describe the formulation of glass sizes containing as the adhesive agent polyvinyl acetate which has been subjected to treatment by a strong acid. The procedure described for hydrolysing the organo-silane is the subject of copending application Serial No. 853,691.

EXAMPLE I

Ingredients: Amount by weight (1) Polyvinyl acetate emulsion (Delplex No. 2002), the adhesive agent _ 4.17%.
(2) Vinyl triethoxy silane, the coupling agent _____ 0.66%.
(3) Polyvinyl pyrrolidone (N.P.K. 30), an assist for the adhesive agent _____ 0.075%.
(4) Hydrochloric acid 20° Bé. for acidifying the adhesive agent _____ 0.75%.
(5) Aqua ammonia _____ As required.
(6) Glacial acetic acid _____ As required.
(7) An amide of a fatty acid sold under the designation A.H.C.O. 185 A, the lubricant _____ 0.10%.
(8) Water _____ Remainder.

The procedure for making up the size was as follows:

*Step 1*

Add 60% of the final volume of cold water to a mixing tank and agitate slowly.

*Step 2*

Adjust the pH of the water to 5.0–5.5 with glacial acetic acid.

*Step 3*

Add ingredient No. 2, very slowly to the acidified water. Agitate for 25 minutes to give a clear solution.

*Step 4*

At the end of the 25 minute mixing period, adjust the pH to 7.2 with diluted aqueous ammonia. To facilitate obtaining close adjustment of the pH, it is convenient to dilute the aqua ammonia with 25 times its own weight of water before using it to adjust the pH.

*Step 5*

When the pH of 7.2 has been attained, agitate for one hour. By this series of steps a partially polymerised vinyl silanol is attained.

*Step 6*

Dilute the hydrochloric acid, ingredient No. 4, with cold water in ratio 1 to 1 and mix thoroughly.

*Step 7*

When the solution prepared according to steps 1 to 5 has been agitating for 30 minutes of the required hour, add the hydrochloric acid, prepared according to step 6, to the polyvinyl acetate emulsion, ingredient No. 1, and agitate slowly. Calculations based on the compositions of ingredients Nos. 1 and 4 indicate that the pH of the mixture thereby formed is about —0.10. The timing is arranged so that the required 30 minutes acidification of the polyvinyl acetate and the one hour treatment of the silane both terminate simultaneously.

*Step 8*

When the two separate solutions have been prepared, and the necessary mixing times have elapsed, the acidified polyvinyl acetate solution is added to the silanol and further agitation effected. To facilitate transference of the acid mix to the main tank, it will be convenient to dilute the acid solution with an equivalent volume of cold water.

*Step 9*

Assuming ingredient No. 7 is to be employed, and this is only a preferred, not an essential ingredient, as being advantageous in providing improved lubricating properties in the final size, this ingredient is dissolved in a minimum quantity of water at 160° F. and the pH adjusted to 6.5 with the acetic acid.

*Step 10*

The resulting solution is cooled to 70° F. and then added to the main mix.

*Step 11*

Ingredient 3, the polyvinyl pyrrolidone, is then dissolved in a minimum quantity of water at 160° F.

*Step 12*

This solution is then cooled to 70° F. and is added to the main mix.

*Step 13*

More water is added to the main mix to bring it to 95% of the required final volume.

*Step 14*

The pH of the mix is adjusted to 4.0–4.5 with aqua ammonia diluted to 15 times its volume with cold water.

*Step 15*

The final volume is then made up with water, agitation being continued. The size is then ready for application to the glass filaments in a conventional manner.

Greatly improved properties in respect of static electricity dissipation were observed in the handling of glass slivers and rovings coated with this size, by comparison with a size similarly formulated except that the polyvinyl acetate was not subjected to treatment with hydrochloric acid.

It has also been found that if the acidification time is increased, the amount of hydrochloric acid can be reduced. For example, in another experiment, the amount of hydrochloric acid was reduced to a third of that indicated above, but this involved an increase of the acidification time from 30 minutes to 24 hours. The advantage to be obtained from the use of less hydrochloric acid is the elimination of the need for neutralization in step 14 with ammonia, or at least the minimization of the amount of ammonia required. The presence of an excess of ammonia is undesirable as giving rise to the formation of ammonium chloride which is a water-receptive salt, the presence of which can be deleterious to the operation of the subsequent laminating operations.

As an alternative to hydrochloric acid, trichloroacetic acid can be used to carry out the same degradation process on the polyvinyl acetate.

Variations in the amounts of the main ingredients are, of course possible. The polyvinyl acetate emulsion could vary in amount from about 1% to 8% of the total weight. As indicated in the example, the optimum amount is about 4%. As the amount is decreased the adhesion between filaments is reduced until no effective bonding is obtained. On the other hand, too much of this ingredient makes the sliver too stiff and difficult to handle and form into rovings.

In the case of the silane, the preferred amount of which is 0.66%, some freedom to vary this value is available. Below about 0.4%, however, the efficiency of coupling becomes too low. There is no upper limit, in the sense of introducing undesirable effects, but this is an expensive ingredient and there is nothing to be gained in employing more than about 0.66%, which has been found to provide the coupling efficiency required.

As an additional feature, a small quantity of diallyl phthalate can be added to the polyvinyl acetate emulsion. An amount of diallyl phthalate up to 30% of the emulsion can be used, satisfactory results having been obtained with 15%. This further ingredient acts as a lubricant and enhances the wetting out properties, i.e., the ability of the size to condition the surfaces of the glass for firm subsequent bonding to a polyester resin. It also renders the sliver processable into yarn on conventional throwing equipment.

EXAMPLE II

A series of experiments were carried out with a view to demonstrating the effect of varying the pH value when treating a polyvinyl acetate emulsion with hydrochloric acid prior to incorporating it in a glass size generally similar to that described in Example I.

The procedure followed involved weighing out two pounds of water and adding to it 0.6 cc. of glacial acetic acid. 32.0 gms. of vinyl tri-methoxyethoxy silane was then added to the dilute acetic acid solution obtained by the first step. This mixture was then agitated for fifteen minutes. At the end of this time the pH was measured and found to be between 4.5 and 5.00. An aqueous solution of triethanolamine was then added slowly while stirring until the pH had risen to 7.2. The mixture was then agitated for one hour more. The solution of a partially polymerised vinyl silanol thereby obtained was divided into four equal parts and one such part used for each of the tests after having added thereto 0.84 gm. of a lubricant sold under the trade mark A.H.C.O. 185 A (a fatty acid and of unknown composition) and 0.84 gm. of polyvinyl pyrrolidone.

In each of the tests polyvinyl acetate was incorporated in the test size as an adhesive agent. 42.8 gms. of an aqueous polyvinyl acetate emulsion, sold under the trademark Delplex No. 2002 was treated with enough hydrochloric acid of 20° Bé. to bring it to a desired pH. The acidified polyvinyl acetate emulsion was then allowed to stand for twenty-four hours. It was then combined with one part of the solution of partially polymerised vinyl silanol obtained as described above and the mixture was diluted with water until a final weight of 2½ pounds was attained. Four sizes were produced in this manner and were tested by applying them in conventional manner to glass filaments which were then brought together to form strands, each strand comprising a bundle of 204 filaments. Thirty such strands were wound together to form a roving. In each case I observed the behaviour of the strands with a view to noting whether or not there was evidence of formation of static electricity. The results of my observations are given below in respect of each of the four sizes which are designated Sizes A, B, and C.

SIZE A

In the preparation of this size sufficient hydrochloric acid was added to the polyvinyl acetate emulsion to bring it to a pH of 0.1. After the prescribed period of 24 hours the polyvinyl acetate emulsion was mixed with the solution of partially polymerised vinyl silanol and after the prescribed dilution with water there was obtained a size having a pH of 2.4.

No problems caused by generation of static electricity were encountered when strands sized with size A were wound into a roving. There was no ballooning of the strands and no attraction of the strands to wood and metal surfaces.

SIZE B

In the preparation of this size sufficient hydrochloric acid was added to the polyvinyl acetate emulsion to bring it to a pH of 0.2. After the prescribed period of 24 hours the polyvinyl acetate emulsion was mixed with the solution of partially polymerised vinyl silanol and after the prescribed dilution with water there was obtained a size having a pH of 2.48.

No problems caused by generation of static electricity were encountered when strands sized with size B were wound into a roving. There was no ballooning of the strands and no attraction of the strands to wood and metal surfaces.

SIZE C

In the preparation of this size sufficient hydrochloric acid was added to the polyvinyl acetate emulsion to bring it to a pH of 0.65. After the prescribed period of 24 hours the polyvinyl acetate emulsion was mixed with the solution of partially polymerised vinyl silanol and after the prescribed dilution with water there was obtained a size having a pH of 3.8.

The strands sized with size C generated static electricity as evidenced by ballooning of the strands, i.e. repulsion of the strands from one another and by attraction of the strands to wood and metal surfaces during the winding of the strands into a roving.

SIZE D

In the preparation of this size sufficient hydrochloric acid was added to the polyvinyl acetate emulsion to bring it to a pH of 0.90. After the prescribed period of 24 hours the polyvinyl acetate emulsion was mixed with the solution of partially polymerised vinyl silanol and after the prescribed dilution with water there was obtained a size having pH of 4.42.

The strands sized with size D generated static electricity as evidenced by ballooning of the strands, i.e. repulsion of the strands from one another and by attraction of the strands to wood and metal surfaces during the winding of the strands into a roving.

It will be noted that with sizes A and B, where treatment at less than pH 0.5 was effected for 24 hours, no problems were encountered due to static generation whereas with sizes C and D, where a treatment at above pH 0.5 was effected for 24 hours, static generation was such as to make the winding of the sized strands difficult.

I claim:

1. An anti-static size for glass fibers comprising as an adhesive agent an aqueous emulsion of polyvinyl acetate which has been subjected to the action of a chlorine-containing strong acid at a pH of less than 0.5 for from 10 minutes to 24 hours whereby to enhance the anti-static properties of the size.
2. A glass size according to claim 1 wherein said acid is hydrochloric acid.
3. A glass size according to claim 1 wherein said acid is trichloroacetic acid.
4. A glass size according to claim 1 wherein said acid is an aqueous solution of hydrochloric acid of 20° Bé. diluted with its own volume of water.
5. An anti-static size for glass fibers comprising as an adhesive agent polyvinyl acetate which has been subjected to the action of a strong acid at a pH of less than 0.5 for from 10 minutes to 24 hours whereby to enhance the anti-static properties of the size and, as a coupling agent, a partially polymerised hydrolysis product of an organo-silane containing an unsaturated aliphatic linkage.
6. A glass size according to claim 5 wherein said organo-silane is a vinyl silane.
7. Glass fibres sized with a size according to claim 1.
8. Glass fibres sized with a size according to claim 5.

References Cited by the Examiner

UNITED STATES PATENTS 2,799,598   7/1957   Biefeld et al. -------- 117—126

MURRAY TILLMAN, *Primary Examiner.*

W. J. BRIGGS, *Assistant Examiner.*

UNITED STATES PATENT OFFICE
CERTIFICATE OF CORRECTION

Patent No. 3,245,938 April 12, 1966

William J. Dennis

It is hereby certified that error appears in the above numbered patent requiring correction and that the said Letters Patent should read as corrected below.

In the grant, line 3, after "Canada," insert -- assignor to Fiberglas Canada Limited, of Toronto, Ontario, Canada, --; line 12, for "William J. Dennis, his heirs" read -- Fiberglas Canada Limited, its successors --; in the heading to the printed specification, lines 4 and 5, for "William J. Dennis, 24 Rosewood Ave., Guelph, Ontario, Canada" read -- William J. Dennis, Guelph, Ontario, Canada, assignor to Fiberglas Canada Limited, Toronto, Ontario, Canada --; column 2, line 32, for "treading" read -- threading --.

Signed and sealed this 1st day of August 1967.

(SEAL)
Attest:

EDWARD M. FLETCHER, JR.
Attesting Officer

EDWARD J. BRENNER
Commissioner of Patents